(12) United States Patent
Foster et al.

(10) Patent No.: US 7,957,951 B2
(45) Date of Patent: Jun. 7, 2011

(54) ADDRESS TRANSLATION SYSTEM FOR USE IN A SIMULATION ENVIRONMENT

(75) Inventors: Timothy W. Foster, Saline, MI (US); Jamey Joseph Cates, Ann Arbor, MI (US); Oliver Schade, Ann Arbor, MI (US); Cornelia Woit, Ann Arbor, MI (US)

(73) Assignees: Robert Bosch GmbH, Stuttgart (DE); ETAS, Inc., Ann Arbor, MI (US)

( * ) Notice: Subject to any disclaimer, the term of this patent is extended or adjusted under 35 U.S.C. 154(b) by 694 days.

(21) Appl. No.: 11/724,826

(22) Filed: Mar. 16, 2007

(65) Prior Publication Data

US 2008/0229150 A1    Sep. 18, 2008

(51) Int. Cl.
*G06F 9/44* (2006.01)
*G06F 17/50* (2006.01)

(52) U.S. Cl. ............................................. 703/21; 716/3

(58) Field of Classification Search ............ 703/13, 703/14, 21; 714/31, 33; 716/3
See application file for complete search history.

(56) References Cited

U.S. PATENT DOCUMENTS

| | | | |
|---|---|---|---|
| 5,446,854 A * | 8/1995 | Khalidi et al. | 711/1 |
| 5,956,756 A * | 9/1999 | Khalidi et al. | 711/207 |
| 6,550,052 B1 | 4/2003 | Joyce et al. | |
| 7,370,296 B2 * | 5/2008 | Koyfman et al. | 716/3 |
| 2006/0123296 A1 * | 6/2006 | Reichert | 714/731 |
| 2009/0158012 A1 * | 6/2009 | Hansen et al. | 712/222 |

OTHER PUBLICATIONS

Otterbach R et al.: "Bypassing Fuer Die Zukunft/Rapid Control, Prototyping Development for Electronic Automobile Control Systems" Auto & Elektronik, Huethig, Heidelberg, DE, vol. 35, No. 9, Sep. 1, 2004, p. 60/61.

Correac et al.: "Rapid Prototyping of Tricore Soc Without Code Changes" VDI Berichte, Duesseldorf, DE, No. 1931, Jan. 1, 2006, pp. 851-865.

Anonymous: "Measurement and Calibration Software for Automotive Electronic Control Units (ECUs)" National Instruments Home Page, vol.-, No.-, 2006, pp. 1-3.

* cited by examiner

*Primary Examiner* — Jason Proctor
*Assistant Examiner* — Andre Pierre Louis
(74) *Attorney, Agent, or Firm* — Merchant & Gould P.C.

(57) ABSTRACT

Methods and systems for simulation of a testable system are provided in which a virtual testable system is used. One method includes inputting a system definition file into a translation utility, where the system definition file includes a plurality of physical addresses required for execution of the system definition file in the testable system. The method also includes inputting a memory map file into the translation utility, the memory map representing a virtual memory space for a virtual testable system. The method further includes generating virtual translation information by translating the physical addresses into virtual addresses using the memory map file.

25 Claims, 9 Drawing Sheets

ADDRESS TRANSLATION SYSTEM FOR USE IN A SIMULATION ENVIRONMENT

TECHNICAL FIELD

The present disclosure relates to interrelation of various test systems; in particular, the present disclosure relates to an address translation system for use in a simulation environment.

BACKGROUND

Calibration of a system for determining an optimal operational configuration generally requires monitoring operation of the testable system, and adjusting one or more parameters affecting operation of the testable system until the system reaches a desired performance level. Observation systems exist which are configured to monitor the activity of the testable system so that calibration of that system can take place. One possible system requiring testing and calibration is an Electronic Control Unit (ECU), such as those found in vehicle control systems for determining fuel consumption, monitoring exhaust gas valves, and other physical characteristics of the vehicle.

Monitoring of such testable systems, such as ECUs, can be time consuming and difficult due to manufacturing timing and other physical constraints. For this reason, it is sometimes advantageous to model the activity of the testable system in software in order to determine the parameter combinations which will provide the desired result, such as improved performance, accuracy, or some other measure of the testable system's activity. Modeling of a testable system can include use of a virtual testable system, such as a separate, adjustable software model useable to represent the actions of the testable system. The virtual testable system may then be simulated and its activity monitored.

Due to differences between the testable system and its counterpart virtual testable system, the virtual testable system often executes in conjunction with a separate simulation or observation system monitoring its activity, different from the observation system which would be used to monitor the testable system. Use of different observation systems for physical and virtual systems adds expense to the testing and calibration process.

Therefore, improvements are desired.

SUMMARY

In accordance with the present disclosure, the above and other problems are solved by the following:

In a first aspect, a method of translating physical addresses for use in a virtual testable system is provided. The method includes inputting a system definition file into a translation utility, where the system definition file includes a plurality of physical addresses required for execution of the system definition file in the testable system. The method also includes inputting a memory map file into the translation utility, the memory map representing a virtual memory space for a virtual testable system. The method further includes generating virtual translation information by translating the physical addresses into virtual addresses using the memory map file.

In a second aspect, an apparatus for simulating a testable system using a virtual testable system is disclosed. The apparatus includes a memory configured to store a system definition file, a memory map file, and virtual translation information. The apparatus further includes a programmable circuit operatively connected to the memory. The programmable circuit is configured to execute program instructions to input a system definition file into a translation utility. The system definition file includes a plurality of physical addresses useable for execution of the system definition file in a testable system. The programmable circuit is further configured to execute program instructions to input a memory map file into the translation utility. The memory map represents a virtual memory space for a virtual testable system. The programmable circuit is also configured to execute program instructions to generate virtual translation information by translating the physical addresses into virtual addresses using the memory map file. The programmable circuit is also configured to execute program instructions to simulate execution of the virtual testable system.

In a third aspect, a system for translating physical addresses for use in a virtual testable system is disclosed. The system includes an input module configured to input a system definition file and a memory map file into a translation utility. The system definition file includes a plurality of physical addresses required for execution of the system definition file in a testable system, and the memory map represents a virtual memory space for a virtual testable system. The system further includes a generation module configured to generate virtual translation information by translating the physical addresses into virtual addresses using the memory map file.

DETAILED DESCRIPTION

Figure 1:
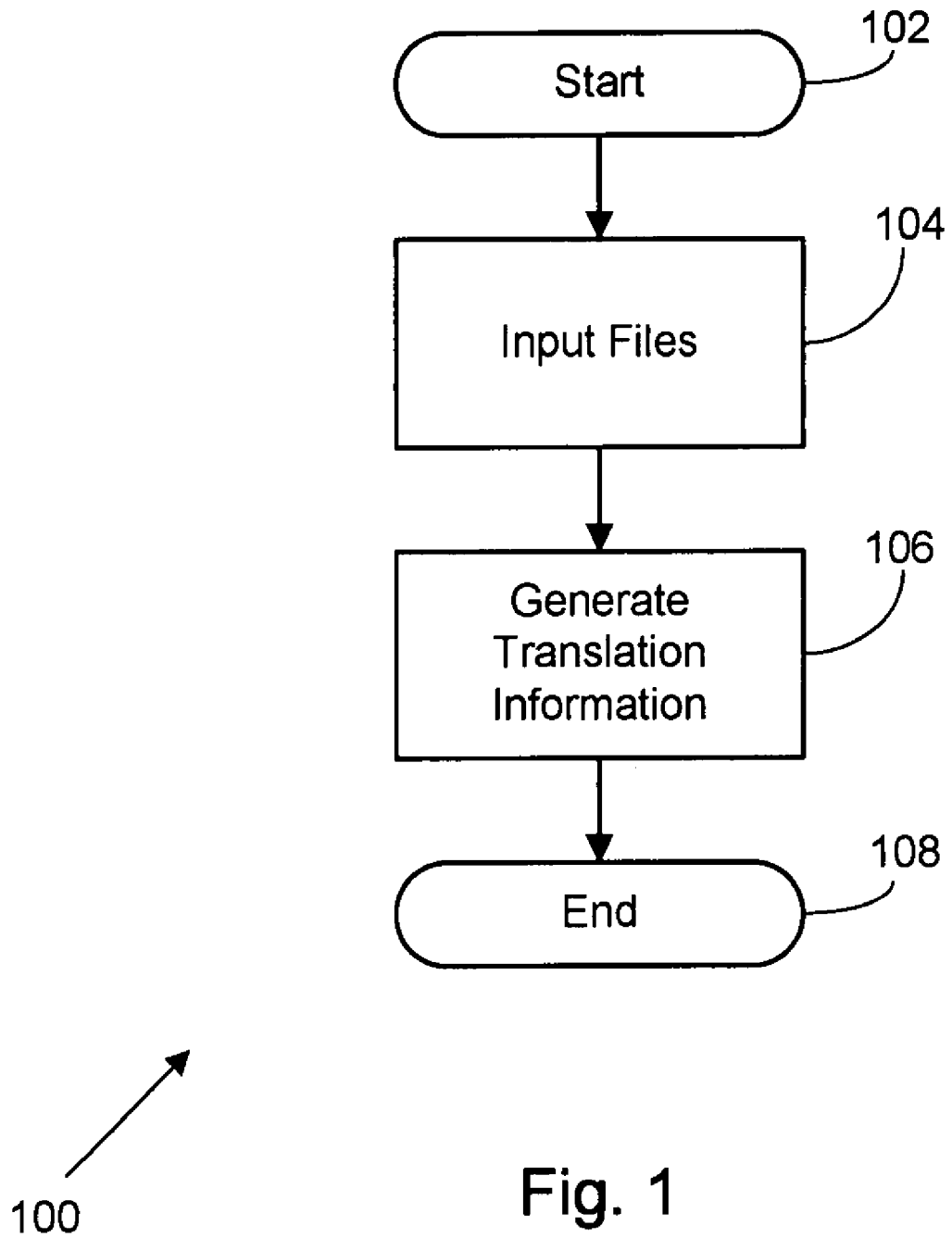
FIG. 1 shows methods and systems for simulating a testable system in a possible embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, (2) a sequence of computer implemented steps, operations, or procedures running on a programmable circuit within a motor vehicle or vehicle test system; and/or (3) interconnected machine modules or program engines within the programmable circuits.

In general the present disclosure relates to simulation of a testable system using a virtual testable system. The present disclosure contemplates use of a virtual testable system which, through the various embodiments described herein, may be observed by an observation system configured for use with a testable system. In various examples described herein, the testable system may be an electronic control unit (ECU) of a motor vehicle. A virtual testable system, such as a software model of that electronic control unit, may be used in conjunction with a test or observation platform designed for use with the ECU. The disclosure contemplates converting the physical addresses communicated by the observation system to virtual addresses understandable to the virtual testable system, and vice versa. Interoperability of test and observation platforms reduces redundancy and allows for sharing components across virtual and physical testbenches to allow for measurement and calibration of virtual and physical systems.

Referring now to FIG. 1, methods and systems for simulating a testable system are shown according to a possible embodiment of the present disclosure. The system 100 shown is configured to simulate a testable system through use of a virtual testable system. The system is instantiated at a start operation 102. Operational flow proceeds to an input module 104. The input module 104 corresponds to input into a translation utility of a system definition file and a memory map file. The system definition file corresponds to a file containing the parameters defining the testable system. In one embodiment, the system definition file includes physical addresses required for execution of the system definition within the testable system. For example, the system definition file can include instructions for operation of an embedded controller of a motor vehicle. In a further embodiment, the system definition file includes virtual addresses required for execution of the system definition within the virtual testable system.

The memory map file represents a memory address space for a virtual or actual testable system. In one embodiment, the memory map file includes virtual addresses generated by a simulation tool. Using the example of the embedded controller of a motor vehicle, the memory map file could include sufficient address space to contain the system definition, but would reside at a different address range, as dictated/allocated by the operating system or other control software of the testbench computing system on which the virtual testable system would reside. In a further embodiment, the memory map file defines an address space for the testable system, rather than the virtual testable system, and is generated by a compiler based on the memory available in the testable system.

Operational flow proceeds to a generation module 106. The generation module 106 generates translation information by translating the addresses in the definition file into different addresses by using the memory map file. The specific address translation performed by the generation module 106 depends upon the environment in which it is executed. In an embodiment in which the memory map represents the virtual address space of a virtual testable system, the generation module 106 maps the physical addresses of the system definition file onto the virtual address space defined in the memory map file to ensure that when various addresses in physical memory would be referenced in the testable system, corresponding addresses in the virtual address space defined in the memory map file are accessed in the virtual testable system. In a further embodiment in which the memory map file represents a physical address space of a testable system, the generation module 106 maps the virtual addresses of the system definition file onto the physical address space available in the testable system.

In various possible embodiments, the generation module 106 executes independently, or can reside and execute within other software components of a testing environment. The generation module 106 may wholly or partially execute within an observation system, a virtual interface, or a virtual simulation tool, and one or more computing systems. Example test environments are shown in FIGS. 4-8, below.

Operational flow terminates at an end operation 108, which corresponds to completion of the translation of memory addresses for use with the system definition file.

Figure 2:
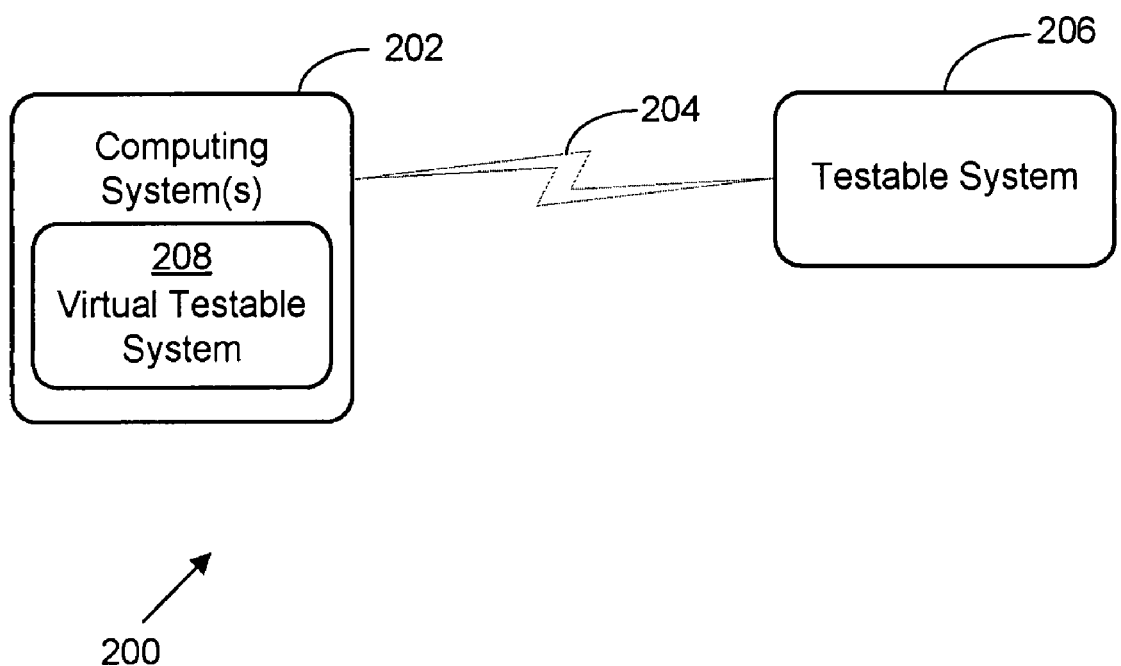
FIG. 2 shows a schematic of an exemplary test environment in which aspects of the present disclosure may be implemented.

Referring now to FIG. 2, a schematic of an exemplary test environment 200 is shown, in which aspects of the present disclosure may be implemented. The test environment includes a computing system 202 interfaced with a testable system 206 via a communication link 204. The computing system 202 represents one or more generalized computing systems, such as the system described below in conjunction with FIG. 3. In a possible embodiment, the computing system 202 is a specialized computing system, also referred to herein as a testbench or testbench system, used for testing a testable system. In such an embodiment, additional or specialized equipment may be added to or substituted into the generalized computing systems described herein.

The testable system 206 is a system generally requiring calibration and/or testing. In one embodiment of the present disclosure, the testable system 206 is an electronic control unit, and can be used in a motor vehicle to detect and calculate any of a number of characteristics of the vehicle or its environment, such as determining fuel consumption, monitoring exhaust gas valves, or other physical characteristics of the vehicle. The testable system 206 generally includes a memory, which defines a physical address space in which instructions executed on the testable system are stored.

The communication link 204 can be any standard or proprietary communication link understandable and interfaceable to both the computing system 202 and testable system 206 incorporated into the test environment 200. In a possible embodiment, the communication link 204 is a direct wired bus link. In other embodiments, the communication link 204 can be a networked communication system, such as any of a number of packet-based data communications networks. Other embodiments are possible as well.

In a particular embodiment in which the testable system 206 is an electronic control unit, the communication link 204 is configured to allow communications between the computing system 202 and testable system 206 using an XCP data communications protocol in which the computing system 202 includes an XCP master communications unit for sending and receiving data, and the testable system 206 includes an XCP slave communications unit for sending and receiving data. Other data communications protocols are possible as well, and may require differing communications links or standards for bandwidth or connectivity considerations. Specific implementations of a variety of embodiments of the test environment 200 are described below in conjunction with FIGS. 4-7.

The computing system 202 hosts a virtual testable system 208, corresponding to a virtual model of the testable system 206 stored on one or more of the computing systems of FIG.

3, as encompassed by the computing system 202. The virtual testable system 208 is assigned a number of virtual memory addresses by the computing system on which it resides, based on available physical memory of that system. The virtual testable system 208 therefore differs from the testable system 204 in that its data and instruction memory will reside at different physical addresses than in the testable system, which may be a system incorporating hardware and software which specifically requires certain attributes/variables to be stored at specific physical addresses for proper operation.

In various embodiments, the specific computing system storing the virtual testable system 208 is not directly connected to the testable system 206 via the communication link 204 if both components are present. Furthermore, various aspects of the present disclosure do not require the presence of the testable system 206 or a specific communication link 204. These aspects of the test environment are shown to illustrate the differences in generalized interaction between the computing system-testable system sub-environment and the computing system-virtual testable system sub-environment.

Figure 3:
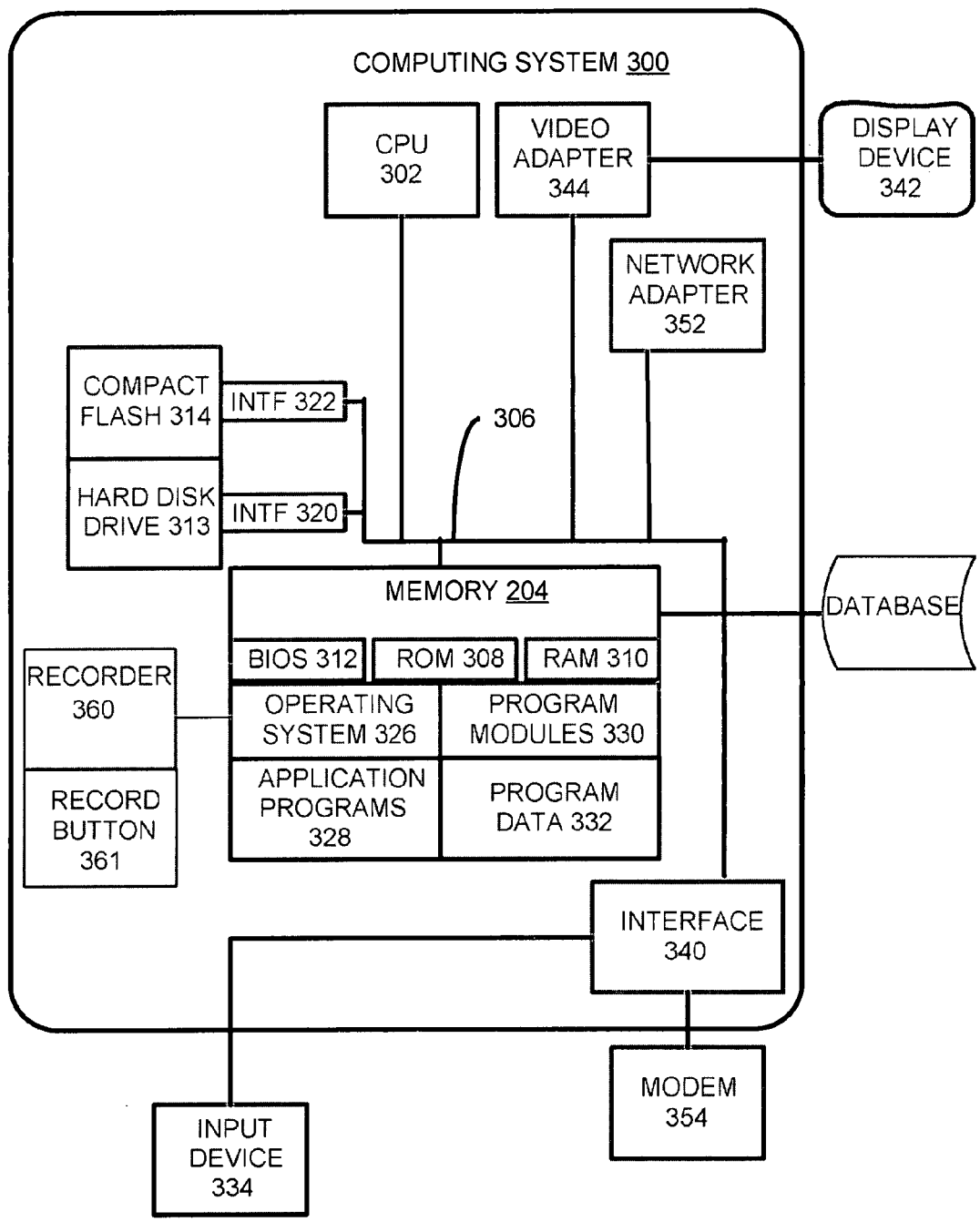
FIG. 3 shows an exemplary environment for implementing various aspects of the present disclosure.

Referring now to FIG. 3, an exemplary environment for implementing embodiments of the present disclosure includes a general purpose computing device in the form of a computing system 300, including at least one processing system 302. A variety of processing units are available from a variety of manufacturers, for example, Intel or Advanced Micro Devices. The computing system 300 also includes a system memory 304, and a system bus 306 that couples various system components including the system memory 304 to the processing unit 302. The system bus 306 might be any of several types of bus structures including a memory bus, or memory controller; a peripheral bus; and a local bus using any of a variety of bus architectures.

Preferably, the system memory 304 includes read only memory (ROM) 308 and random access memory (RAM) 310. A basic input/output system 312 (BIOS), containing the basic routines that help transfer information between elements within the computing system 300, such as during start up, is typically stored in the ROM 308.

Preferably, the computing system 300 further includes a secondary storage device 313, such as a hard disk drive, for reading from and writing to a hard disk (not shown), and/or a compact flash card 314.

The hard disk drive 313 and compact flash card 314 are connected to the system bus 306 by a hard disk drive interface 320 and a compact flash card interface 322, respectively. The drives and cards and their associated computer readable media provide nonvolatile storage of computer readable instructions, data structures, program modules and other data for the computing system 300.

Although the exemplary environment described herein employs a hard disk drive 313 and a compact flash card 314, it should be appreciated by those skilled in the art that other types of computer-readable media, capable of storing data, can be used in the exemplary system. Examples of these other types of computer-readable mediums include magnetic cassettes, flash memory cards, digital video disks, Bernoulli cartridges, CD ROMS, DVD ROMS, random access memories (RAMs), read only memories (ROMs), and the like.

A number of program modules may be stored on the hard disk 313, compact flash card 314, ROM 308, or RAM 310, including an operating system 326, one or more application programs 328, other program modules 330, and program data 332. A user may enter commands and information into the computing system 300 through an input device 334. Examples of input devices might include a keyboard, mouse, microphone, joystick, game pad, satellite dish, scanner, digital camera, touch screen, and a telephone. These and other input devices are often connected to the processing unit 302 through an interface 340 that is coupled to the system bus 306. These input devices also might be connected by any number of interfaces, such as a parallel port, serial port, game port, or a universal serial bus (USB). A display device 342, such as a monitor or touch screen LCD panel, is also connected to the system bus 306 via an interface, such as a video adapter 344. The display device 342 might be internal or external. In addition to the display device 342, computing systems, in general, typically include other peripheral devices (not shown), such as speakers, printers, and palm devices.

When used in a LAN networking environment, the computing system 300 is connected to the local network through a network interface or adapter 352. When used in a WAN networking environment, such as the Internet, the computing system 300 typically includes a modem 354 or other means, such as a direct connection, for establishing communications over the wide area network. The modem 354, which can be internal or external, is connected to the system bus 306 via the interface 340. In a networked environment, program modules depicted relative to the computing system 300, or portions thereof, may be stored in a remote memory storage device. It will be appreciated that the network connections shown are exemplary and other means of establishing a communications link between the computing systems may be used.

The computing system 300 might also include a recorder 360 connected to the memory 304. The recorder 360 includes a microphone for receiving sound input and is in communication with the memory 304 for buffering and storing the sound input. Preferably, the recorder 360 also includes a record button 361 for activating the microphone and communicating the sound input to the memory 304.

A computing device, such as computing system 300, typically includes at least some form of computer-readable media. Computer readable media can be any available media that can be accessed by the computing system 300. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 300.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 6:
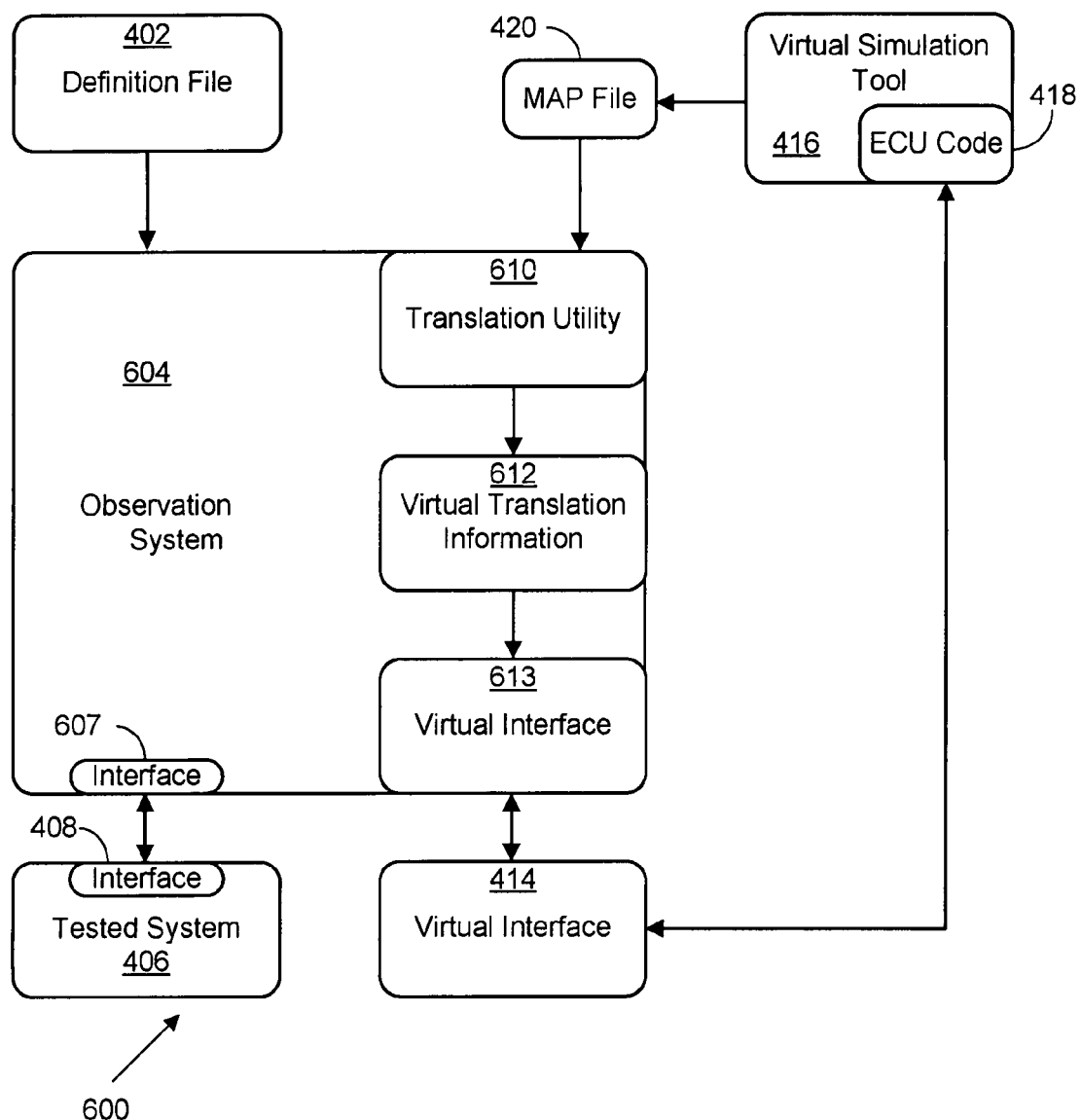
FIG. 6 shows a schematic illustration of a testing environment according to a third possible embodiment of the present disclosure.
Figure 7:
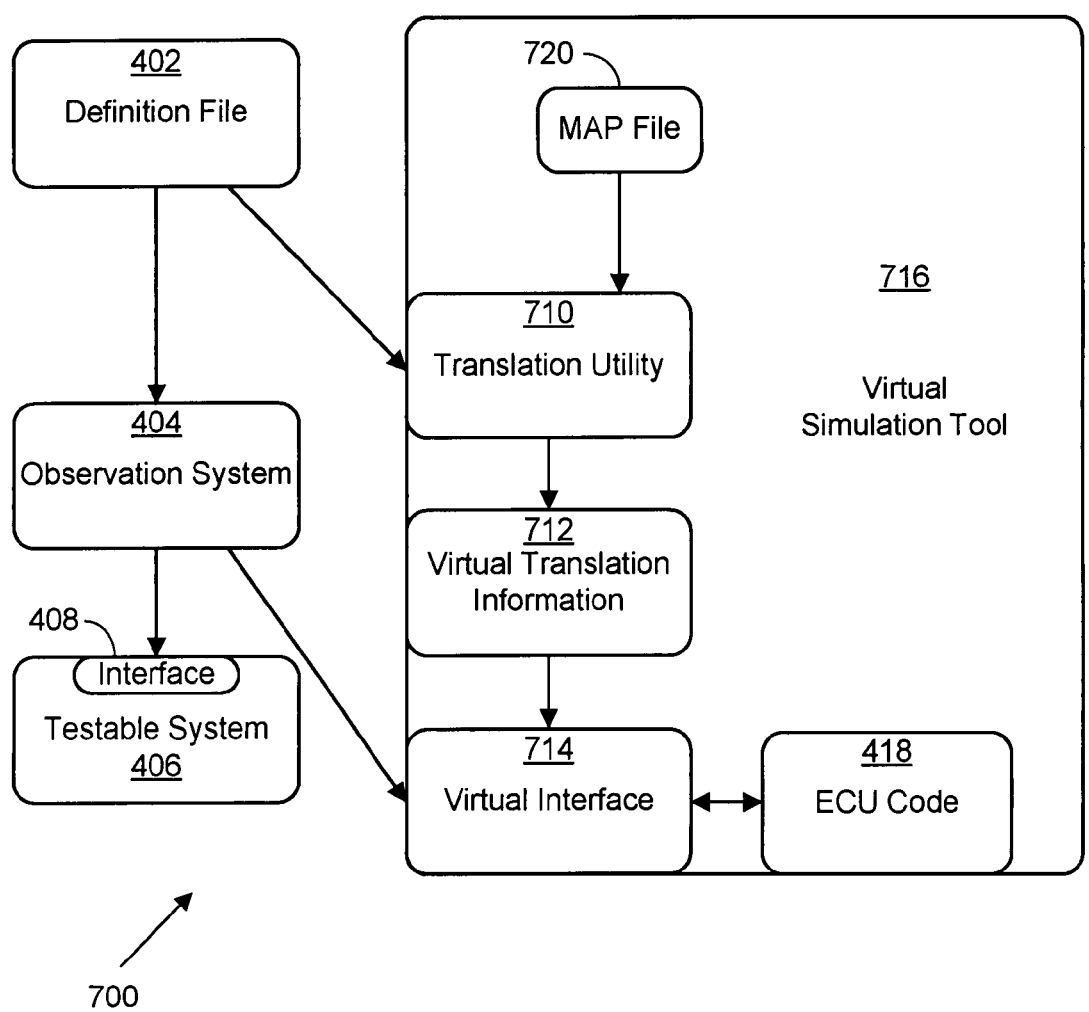
FIG. 7 shows a schematic illustration of a testing environment according to a fourth possible embodiment of the present disclosure.
Figure 8:
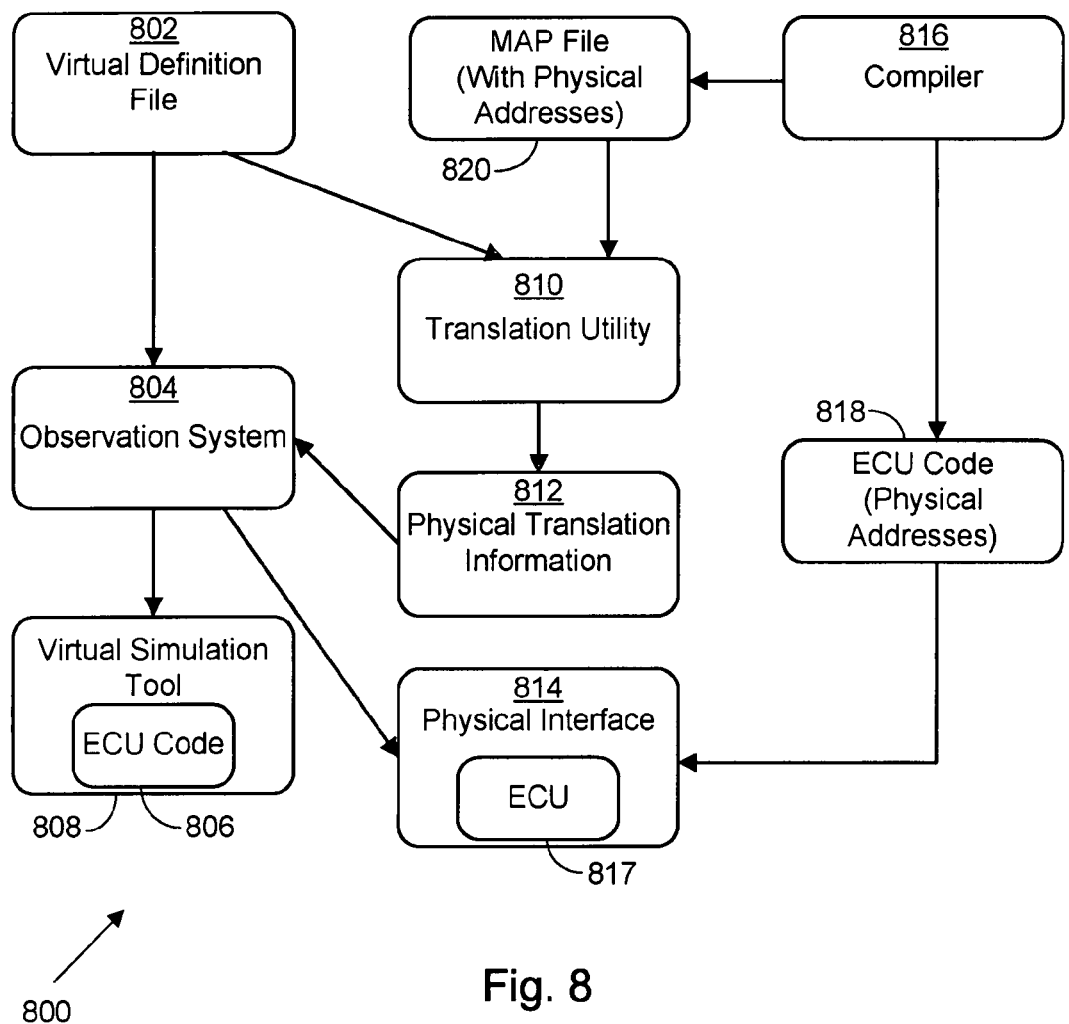
FIG. 8 shows a schematic illustration of a testing environment according to a further possible embodiment of the present disclosure.

Referring now to FIGS. 4-8, schematic illustrations of various testing environments are shown according to possible embodiments of the present disclosure. FIGS. 4-7 illustrate environments for translation of physical addresses of a testable system into virtual addresses for use in a virtual testable system; FIG. 8 illustrates an environment for translation of virtual addresses of a virtual testable system into physical addresses for use in a testable system. The environment selected for use according to the present disclosure is a matter of choice; generally, when first simulating a physical testable system and later migrating to simulate a virtual testable system, environments such as those disclosed in FIGS. 4-7 are implemented. Conversely, when initial testing occurs on a virtual testable system and a transition to testing (measuring and calibration) of a physical system is desired, an environment such as the one disclosed in FIG. 8 may be implemented. Other environments may be used as well.

Figure 4:
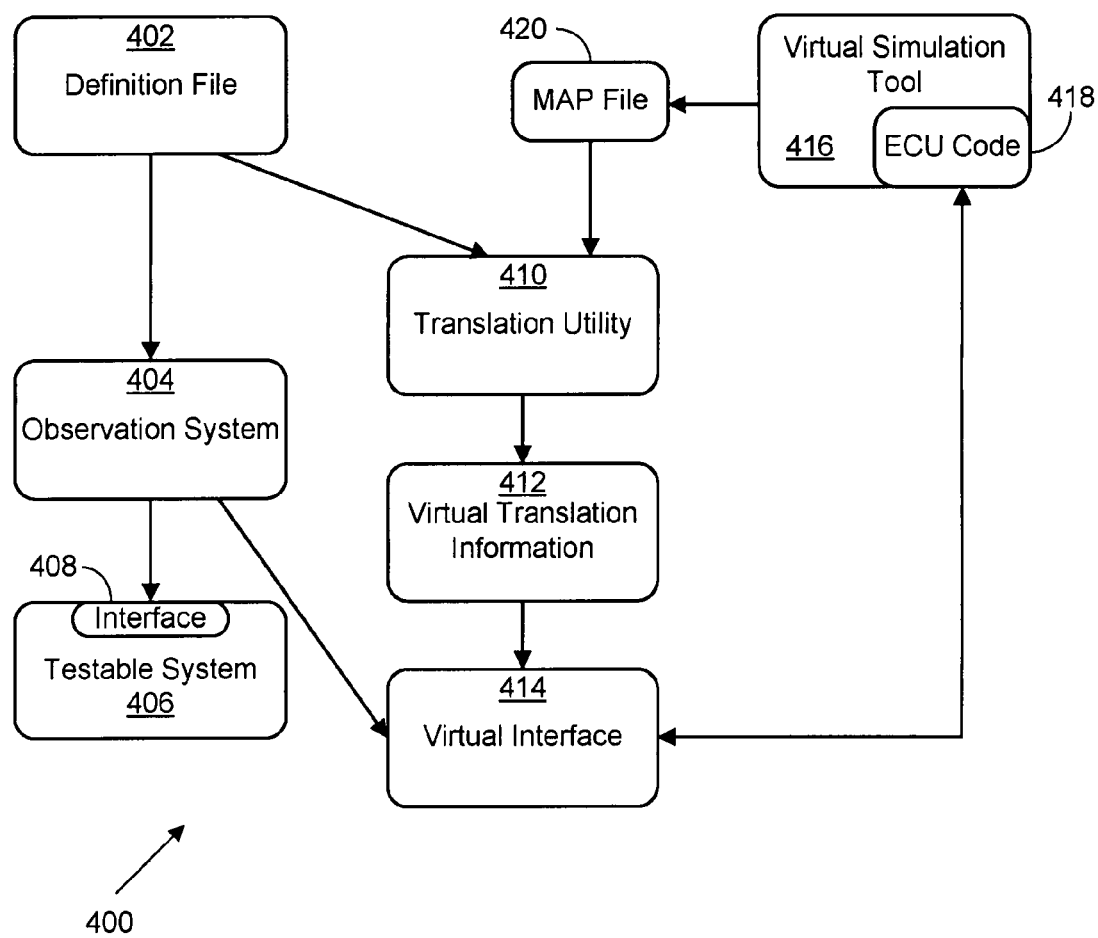
FIG. 4 shows a schematic illustration of a testing environment according to a possible embodiment of the present disclosure.

FIG. 4 illustrates a first possible testing environment 400 in which aspects of the present disclosure can be implemented. In the embodiment shown, the environment 400 includes a definition file 402, an observation system 404, and a testable system 406, which make up a typical physical test environment. The definition file 402 defines the operation of the testable system 406, and include software executable on the testable system 406. The definition file 402 may only be partially stored on or executed by the testable system 406. The definition file 402 includes information regarding storage of data and instructions at physical addresses of a memory, such as a memory of a testable system 406, described below. In a possible embodiment, the definition file 402 is an ASAM MCD 2MC file (stored as an .A2L file) describing the operation of an electronic control unit of a motor vehicle.

The observation system 404 is configured to receive the definition file 402 and to observe system execution of any of a number of testable systems, such as the testable system 406 shown. The observation system 404 is configured for measurement and calibration of the testable system 406, such as by using any of a number of test communication interfaces to request, receive, store, and allow modification of various characteristics of the testable system at various stages throughout the system execution process for measurement and calibration. Optionally, the observation system 404 transmits environmental variables to the testable system 406 to provoke specific behavior of the system, and observes its response to verify proper execution.

The testable system 406 is generally any system whose operation is defined in software, such as a microcontroller or computation unit. The testable system 406 generally includes a memory space having a plurality of physical memory addresses in which the definition file 402 can be stored. The physical addresses in the definition file 402 correspond to the physical addresses of the testable system 406, such that aspects of the definition file 402 execute on the testable system 406 to perform the typical operations of that system when in use.

In various possible embodiments, the testable system 406 can be an electronic control or monitoring unit, such as an electronic computation unit (ECU) which may be found on a motor vehicle. In such embodiments, the observation system 404 can be any of a number of test, simulation, or observation systems for use in conjunction with an ECU, such as the INCA monitoring and calibration system provided by ETAS GmbH.

A communication interface 408 incorporated with the testable system 406 provides communication between the testable system and the observation system. In one embodiment, the communication interface 408 is an XCP slave interface communicating with the observation system 404 using XCP protocols. In further embodiments, different or additional protocols may be used by the communication interface 408.

The environment 400 also includes additional aspects used for virtual simulation, including a translation utility 410 and virtual translation information 412. The translation utility 410 receives the definition file 402 and a memory map file 420, described below, to convert the physical addresses assigned to data and instructions in the definition file 402 onto a virtual address space defined in the memory map file 420. In performing this conversion, the translation utility 410 recomputes branch target addresses, data addresses, and other memory pointers, as well as the storage addresses of data and instructions for execution within the virtual address space.

The virtual translation information 412 is produced by the translation utility 410, and is used during the simulation and testing of the virtual testable system 418. In various embodiments, the virtual translation information 412 can be a variety of instructions, file structures, or database structures, such as a table, array, translation module, or other system configured to provide associations between physical addresses of the testable system 406 with virtual addresses defined by the memory map file 420, as allocated using the virtual simulation tool 416.

A virtual interface 414 connects the observation system 404 to a virtual simulation tool 416, which includes the virtual testable system 418, shown as ECU code. The virtual interface 414 simulates the interface 408 used by the testable system 406 such that the observation system 404 is able to interface to either the testable system 406 or a virtual testable system 418. In the various embodiments in which the interface 408 is a slave XCP interface, the virtual interface 414 simulates the actions of a slave XCP interface, transmitting and receiving data between the observation system and the virtual testable system 418.

The virtual simulation tool 416 provides a software environment in which the virtual testable system 418 can operate. The virtual testable system 418 corresponds to the testable system 406, and defines the same functionality as that system, but is not linked to the physical addresses to which the testable system 406 is linked. Rather, the virtual testable system 418 uses an address space dynamically allocated to it by the virtual simulation tool. The virtual simulation tool 416 hosts the virtual testable model by reserving virtual address space for storage of the virtual testable system 418, and simulating additional environmental conditions generally encountered by the testable system 406 in a physical environment.

The virtual simulation tool 416 provides a memory map file 420, shown to be stored in a MAP file format, to the translation utility 410 corresponding to the virtual memory allocated to the virtual testable system 418. The memory map file 420 includes virtual addresses which correspond to the data and instruction address space allocated to the virtual testable system 418 by the virtual simulation tool 416. In various additional embodiments, other formats of memory map files containing virtual addresses may be provided from the virtual simulation tool 416 to the translation utility which are understandable to both may be used.

Through use of the translation utility 410 and virtual translation information 412, a virtual testable system 418 and a testable system 406 can be tested using the same observation system 404, and the same system definition file 402 can be used for both systems. This allows users of the environment 400 to easily test one or both systems using the same files and systems, in an instance in which testing and calibration begins with a physical model.

Various embodiments of the environment 400 may include more or fewer components, and may reside on one or more computing systems or environments, as discussed above in conjunction with FIG. 2. In one embodiment, the testable system 406 is not present, which may correspond to an instance in which a virtual testable system is simulated prior to completion or design of the physical aspect of the testable system.

Figure 5:
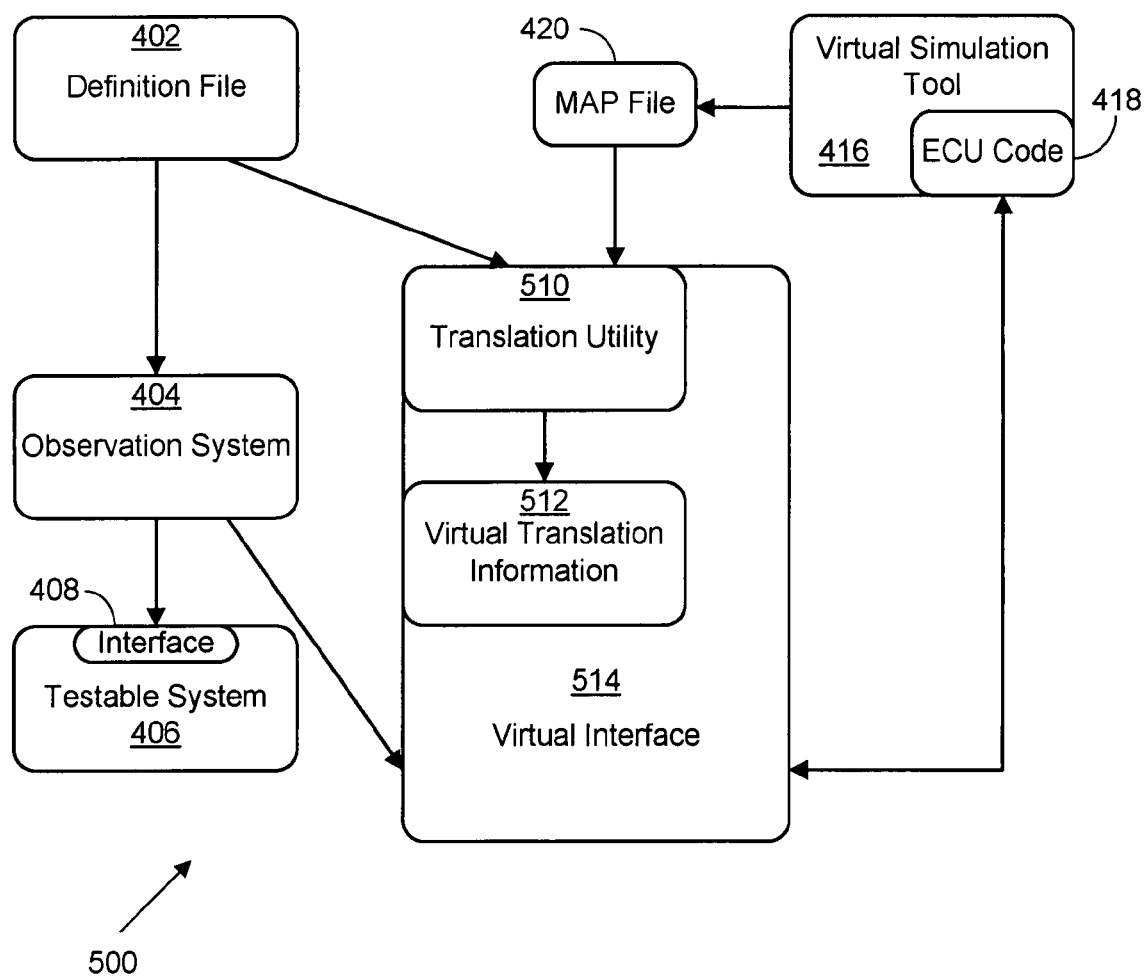
FIG. 5 shows a schematic illustration of a testing environment according to a second possible embodiment of the present disclosure.

FIG. 5 illustrates a second possible testing environment 500 illustrating aspects of the present disclosure. The testing environment 500 generally corresponds to the testing environment 400 of FIG. 4, but includes an extensible virtual interface 514 with an integrated translation utility 510, and storing virtual translation information 512. The extensible virtual interface 514 can communicate with the observation system 404 using any of a number of interfaces, such as the XCP interface. In a possible embodiment, the virtual interface 514 is a virtual XCP slave configured to communicate with a corresponding XCP master integrated within the observation system 404.

The testing environment 500 may be configured such that the virtual interface 514 executes on a computing system separate from the observation system or virtual simulation tool 416, such that the XCP or other interfaces incorporated into the system operate over one of a variety of types of communication links, such as those described in conjunction with FIG. 2. Additional configurations, in which one or more of the components of the environment 500 are on common computing systems, are possible as well.

FIG. 6 illustrates a third possible testing environment 600 illustrating aspects of the present disclosure. The testing environment 600 also generally corresponds to the testing environment 400 of FIG. 4, but includes an extensible observation system 604 with an integrated translation utility 610, and integrally stores virtual translation information 612. The observation system 604 includes an interface 607, configured for use in connection with the interface 408 of the tested system 406. In one possible embodiment, the interface 607 is an XCP master interface configured for use with an XCP slave interface, such as may be found in the testable system. In various other embodiments, different interface types may be used as well.

The observation system 604 also includes a virtual interface 613 as shown, for use in connection with the interface 414 used to interface with the virtual testable system 418. In one embodiment, the virtual interface 613 is a virtual XCP master interface for use with a virtual XCP slave interface. Other virtual interfaces may be implemented to ensure compatibility between the virtual interface and the interface. In a possible embodiment, the observation system may include various types of interfaces and virtual interfaces for connection to various types of testable systems and simulation of such connections for use with virtual testable systems.

As with the environment shown in FIG. 5, the environment 600 may be configured to execute on one or more computing systems, such as the observation system 604 residing on a separate system from the virtual interface 414, the virtual simulation tool 416, and other components of the system.

FIG. 7 illustrates a fourth possible testing environment 800 illustrating aspects of the present disclosure. The testing environment 700 again corresponds to the testing environment 400 of FIG. 4, but includes an extensible virtual simulation tool 716 that uses an internally managed map file 720 in an integrated translation utility 710, to generate virtual translation information 712, which is also managed by the virtual simulation tool 716. The virtual simulation tool 716 also includes a virtual interface 714 for use in connection with the virtual testable system. As with the environment shown in FIGS. 5-6, the environment 700 may be configured to execute on one or more computing systems.

FIG. 8 illustrates a further possible testing environment 800 in which aspects of the present disclosure can be implemented. In the embodiment shown, the environment 800 includes a definition file 802, an observation system 804, a virtual testable system 806, and a virtual simulation tool 808, which make up a virtual test environment.

The definition file 802 defines the operation of the virtual testable system 806, and include software executable on the virtual testable system 806. The definition file 802 includes information regarding storage of data and instructions at virtual addresses allocated by the virtual simulation tool 808. As in the previous environments, the definition file 802 can be an ASAM MCD 2MC file (stored as an .A2L file) describing the operation of a virtual electronic control unit operating within a virtual simulation tool 808, which simulates execution of the virtual testable system. In various possible embodiments, the virtual simulation tool 808 corresponds to the virtual simulation tools 416, 716 described above in conjunction with FIGS. 4-7.

The observation system 804 is configured to receive the definition file 802 and to observe system execution of virtual testable systems. The observation system 804 is configured for measurement and calibration of the virtual testable system 806, such as by using any of a number of test communication interfaces to request, receive, and store various characteristics of the virtual testable system 806 from the virtual simulation tool 808.

The environment 800 also includes additional aspects used for non-virtual or physical testing, including a translation utility 810 and virtual translation information 812. The translation utility 810 receives the definition file 802 and a memory map file 820, described below, to convert the virtual addresses assigned to data and instructions in the definition file 802 onto a physical address space defined in the memory map file 820. In performing this conversion, the translation utility 810 again recomputes branch target addresses, data addresses, and other memory pointers, as well as the storage addresses of data and instructions for execution within the virtual address space.

The virtual translation information 812 is produced by the translation utility 810, and is used during the simulation and testing of the testable system 817 and associated code 818. The virtual translation information 812 is provided to the observation system 804 for translation of the virtual definition file 802 onto addresses corresponding to the physical testable system 817. In various embodiments, the virtual translation information 812 can be a variety of instructions, file structures, or database structures, such as a table, array, translation module, or other system configured to provide associations between virtual addresses allocated by the virtual simulation tool 808 for use by the virtual testable system 806 with addresses defined by the memory map file 820, as allocated and defined by a compiler 816 and configured to meet the physical memory constraints of the testable system 817.

A physical interface 814 manages the connection between the observation system 804 and a testable system 817, which executes system code 818. In the embodiment shown, the testable system 817 is an ECU, and the code 818 is ECU code. The physical interface 814 provides the interface simulated by the virtual simulation tool 808 and observation system 804. In a possible embodiment, the physical interface 814 is an XCP communications interface useable for transmitting and receiving data to and from the observation system 804.

The compiler 816 generates executable code 818 for the testable system 817, and also generates a memory map file 820. The compiler 816 is provided with a specific memory space upon which the code 818 it generates must fit.

The compiler 816 also generates a memory map file 820, shown to be stored in a MAP file format, and provides it to the translation utility 810. The memory map file in this embodiment corresponds to the physical memory of the testable system 817. The memory map file 820 includes physical addresses which correspond to the data and instruction address space allocated in the testable system 817 based on physical constraints.

Through use of the translation utility 810 and virtual translation information 812, a testable system 817 and a virtual testable system 806 can be tested using the same observation system 804, and the same system definition file 802 can be used for both systems. This allows users of the environment 800 to easily test one or both systems using the same files and systems, in an instance in which testing and calibration begins with a virtual model.

Figure 9:
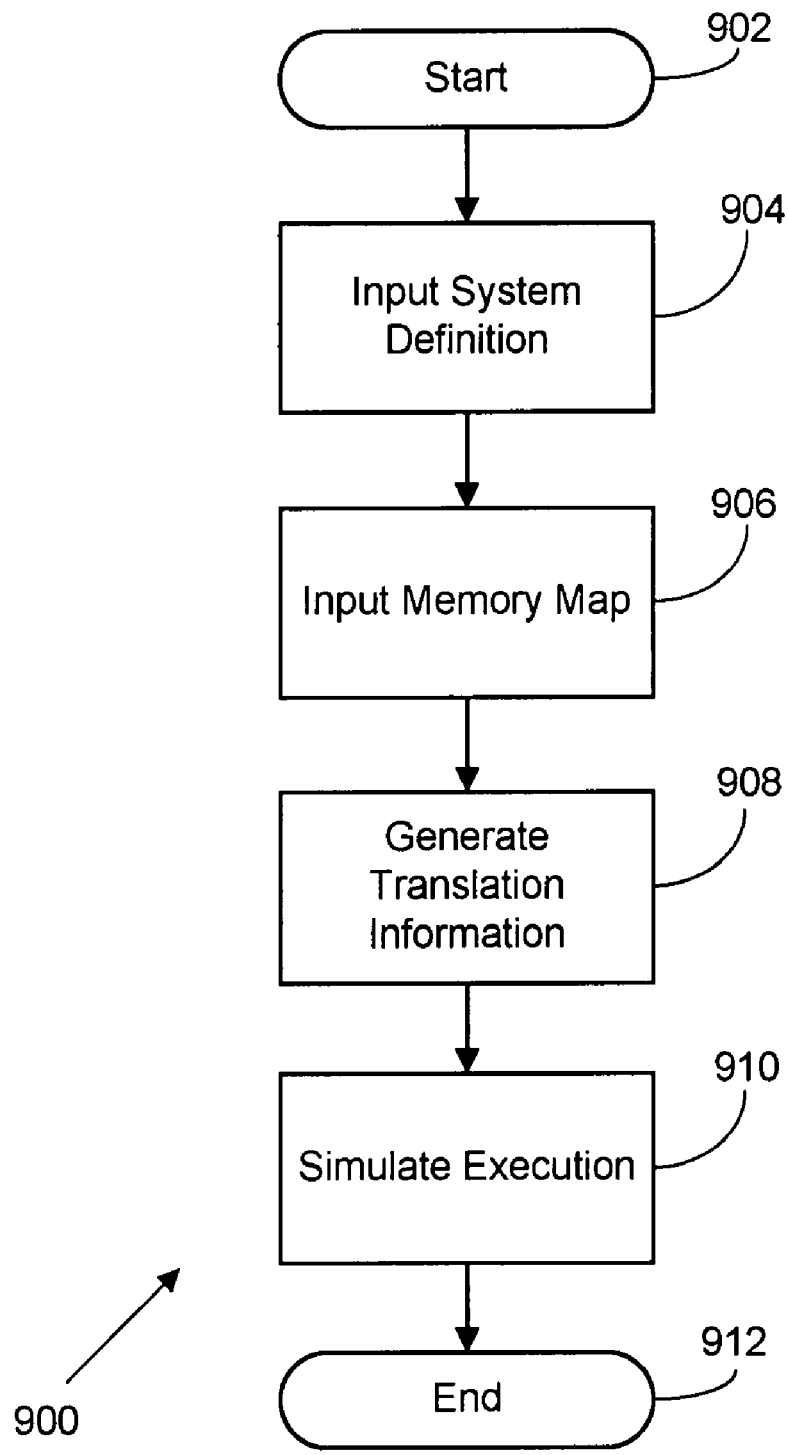
FIG. 9 shows further methods and systems for simulating a testable system using a virtual testable system according to a possible embodiment of the present disclosure.

FIG. 9 shows further methods and systems for calibration and simulation of a testable system using a virtual testable system according to a possible embodiment of the present disclosure. The system 900 is configured to simulate a testable system using a virtual testable system, or vice versa. Operational flow of the system is instantiated at a start operation 902, which corresponds to beginning simulation or preparation for simulation of the virtual testable system or testing of a physical testable system.

Operational flow proceeds to a system input module 904. The system input module 904 provides a system definition file including addresses for storing data in a physical or virtual testable system. The system definition file can be any of a number of system files based on physical or virtual addresses such as those described in FIGS. 4-8, and can be provided to a translation utility. The translation utility can also be configured in a number of ways, as previously discussed.

Operational flow proceeds to a memory map input module 906. The memory map input module 906 provides a memory map file containing virtual addresses allocated to a virtual testable system. In a possible embodiment, the memory map file represents a virtual address space allocated for a virtual testable system by a virtual simulation tool, and is input to the translation utility. In a further possible embodiment, the memory map file represents a physical address space allocated for a testable system by a compiler. In either embodiment, the memory map file can be stored in a MAP file format.

Operational flow proceeds to an address generation module 908. The address generation module 908 generates translation information that correspond the physical addresses of a testable system to virtual addresses of a virtual testable system hosted in a virtual simulation tool. In a possible embodiment, such as those of FIGS. 4-7, the translation information is generated from a memory map file defining a virtual address space and a definition file containing physical addresses to be translated into virtual addresses. In a further possible embodiment, such as the one shown in FIG. 8, the translation information is generated from a memory map file defining a physical address space and a definition file containing virtual addresses to be translated into physical addresses.

Operational flow proceeds to a simulation module 910. The simulation module 910 corresponds to simulation of a virtual testable system or measurement and calibration of a physical testable system. The simulation module 910 may include simulation of the virtual testable system by using a definition file and virtual translation information to direct simulation of the virtual system, i.e. using the system definition file intended for use with a physical testable system. Alternately, the simulation module may include measurement and calibration of the testable system by using a virtual definition file and physical translation information to direct simulation of a physical testable system. In various possible embodiments, simulation includes repeated testing and calibration of the virtual or physical testable system.

Operational flow terminates at an end module 912, which corresponds to completion of the simulation of the virtual or physical testable system.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method of translating physical addresses of a testable system into virtual addresses for use in a virtual testable system in a testing environment, the method comprising:
    inputting a system definition file into a translation utility of a testing environment, wherein the system definition file includes control parameters for a testable system and a plurality of physical addresses required for execution of the system definition file in the testable system;
    inputting a memory map file into the translation utility, the memory map representing a virtual memory space for a virtual testable system;
    generating virtual translation information by translating the physical addresses into virtual addresses using the memory map file;
    measuring and calibrating, by an observation system of the testing environment, the testable system using the system definition file, wherein the observation system connects to the testable system via a physical interface; wherein the testable system comprises an electronic control unit (ECU) used in a motor vehicle and configured to detect and calculate characteristics of the motor vehicle; and
    measuring and calibrating, by the observation system of the testing environment, the virtual testable system using the virtual translation information, wherein the observation system connects to the virtual testable system via a virtual interface.

2. The method of claim 1, further comprising simulating execution of the virtual testable system.

3. The method of claim 2, further comprising using a simulation tool to simulate execution of the virtual testable system.

4. The method of claim 3, wherein simulating the virtual testable system includes resolving memory addresses received from the simulation tool using the virtual translation information.

5. The method of claim 1, further comprising using a data acquisition interface to receive data from the virtual testable system.

6. The method of claim 2, wherein simulating execution of the virtual testable system comprises measuring one or more parameters of the virtual testable system.

7. The method of claim 6, wherein the one or more parameters are selected from the group consisting of data output generated by the virtual testable system; messages transmitted along a data acquisition interface; and measurement signals generated by the virtual testable system.

8. The method of claim 6, wherein simulating execution of the virtual testable system comprises calibrating the virtual testable system.

9. The method of claim 1, wherein the system definition file includes control parameters for an electronic control unit of a motor vehicle.

10. The method of claim 1, wherein the system definition file is an A2L file.

11. The method of claim 1, wherein the memory map file is a MAP file.

12. The method of claim 1, wherein the memory map file is provided by a virtual simulation tool.

13. An apparatus for simulating a testable system using a virtual testable system in a testing environment, the apparatus comprising:
- a memory configured to store a system definition file, a memory map file, and virtual translation information;
- a programmable circuit operatively connected to the memory, the programmable circuit configured to execute program instructions to:
  - input a system definition file into a translation utility of a testing environment, the system definition file including control parameters for a testable system and a plurality of physical addresses useable for execution of the system definition file in the testable system;
  - input a memory map file into the translation utility, the memory map representing a virtual memory space for a virtual testable system;
  - generate virtual translation information by translating the physical addresses into virtual addresses using the memory map file;
  - measure and calibrate, by an observation system of the testing environment, the testable system using the system definition file, wherein the observation system connects to the testable system via a physical interface; wherein the testable system comprises an electronic control unit (ECU) used in a motor vehicle and configured to detect and calculate characteristics of the motor vehicle; and
  - measure and calibrate, by the observation system of the testing environment, the virtual testable system using the virtual translation information, wherein the observation system connects to the virtual testable system via a virtual interface.

14. The apparatus of claim 13, wherein the programmable circuit is further programmed to use a simulation tool to simulate execution of the virtual testable system.

15. The apparatus of claim 14, further comprising a data acquisition interface configured to receive data from the virtual testable system in the simulation tool.

16. The apparatus of claim 13, wherein the programmable circuit is further programmed to, while simulating execution of the virtual testable system, resolving memory addresses using the virtual translation information.

17. The apparatus of claim 13, wherein the programmable circuit is further programmed to, while simulating execution of the virtual testable system, measure one or more parameters of the virtual testable system.

18. The apparatus of claim 17, wherein the one or more parameters are selected from the group consisting of:
- data output generated by the virtual testable system;
- messages transmitted along a data acquisition interface; and
- measurement signals generated by the virtual testable system.

19. The apparatus of claim 13, wherein simulating execution of the virtual testable system comprises calibrating the virtual testable system.

20. The apparatus of claim 13, wherein the system definition file includes control parameters for an electronic control unit of a motor vehicle.

21. A system for translating physical addresses of a testable system into virtual addresses for use in a virtual testable system in a testing environment, the system comprising:
- an input module executing within a translation utility of a testing environment including an observation system, wherein the input module is configured to input a system definition file and a memory map file into the translation utility, the system definition file including control parameters for a testable system and a plurality of physical addresses required for execution of the system definition file in the testable system, the memory map file representing a virtual memory space for a virtual testable system;
- a generation module executing within one of: the observation system; a virtual simulation tool of the testing environment; and a virtual interface of the testing environment, wherein the generation module is configured to generate virtual translation information by translating the physical addresses into virtual addresses using the memory map file; and
- a calibration module executing within the observation system of the testing environment, wherein the calibration module is configured to measure and calibrate the testable system using the system definition file and, the virtual testable system using the virtual translation information provided to the virtual testable system via a virtual interface connecting the virtual testable system and the observation system; wherein the testable system comprises an electronic control unit (ECU) used in a motor vehicle and configured to detect and calculate characteristics of the motor vehicle.

22. The system of claim 21, further comprising a simulation module configured to simulate execution of the virtual testable system.

23. The system of claim 21, wherein the generation module executes within the virtual simulation tool.

24. The system of claim 21, wherein the generation module executes within the observation system.

25. The system of claim 21, wherein the generation module executes within the virtual interface.

* * * * *